United States Patent

[11] 3,582,870

[72] Inventors Charles H. Peterson;
 Curtiss C. Krueger, both of San Diego, Calif.
[21] Appl. No. 805,724
[22] Filed Mar. 10, 1969
[45] Patented June 1, 1971
[73] Assignee Normda Industries, Inc
 San Diego, Calif.

[54] ULTRASONIC DETECTION SYSTEM
 17 Claims, 1 Drawing Fig.
[52] U.S. Cl. .................................................. 340/1,
 340/3, 340/258, 343/7.7
[51] Int. Cl. ...................................................... G01s 9/66
[50] Field of Search .......................................... 343/5 PD,
 7.7; 340/1, 1 T, 3 D, 258

[56] References Cited
 UNITED STATES PATENTS

| | | | |
|---|---|---|---|
| 2,655,645 | 10/1953 | Bagno .......................... | 340/3D |
| 3,109,154 | 10/1963 | Grada et al. ................. | 340/3 |
| 3,275,975 | 9/1966 | King............................. | 340/1 |
| 3,383,678 | 5/1968 | Palmer.......................... | 343/5 |
| 3,394,342 | 7/1968 | Walker......................... | 340/1 |

Primary Examiner—Richard A. Farley
Attorney—Littlepage, Quaintance, Wray and Aisenberg ABSTRACT: Highly stable ultrasonic intruder detection systems employ broad band electrostatic transducers supplied by high voltage AC and high voltage DC. Similar receiver transducers supplied by the high voltage DC produce an AC current upon receiving ultrasonic vibrations. An amplifier with inverse logarithmic gain characteristics amplifies the incoming signal and passes it to a transistorized comparator where any Doppler signal is extracted by comparing the incoming signal with the broadcast signal. Combined Doppler amplifiers and band-pass filters amplify the Doppler signal and remove portions of the signals which are higher or lower in frequency than a range of human movement Doppler producing frequencies. A Doppler signal detector converts the filtered and amplified AC Doppler signal to a DC signal that is proportional to the average of incoming AC signals. When the DC voltage level reaches or exceeds a threshold level, an integrator begins charging and continues to charge. When the DC signal falls below the threshold, the capacitor is immediately discharged. When the capacitor has been charged over a predetermined period of time, a relay is actuated to set off an alarm. The alarm continues as long as the DC Doppler threshold is exceeded.

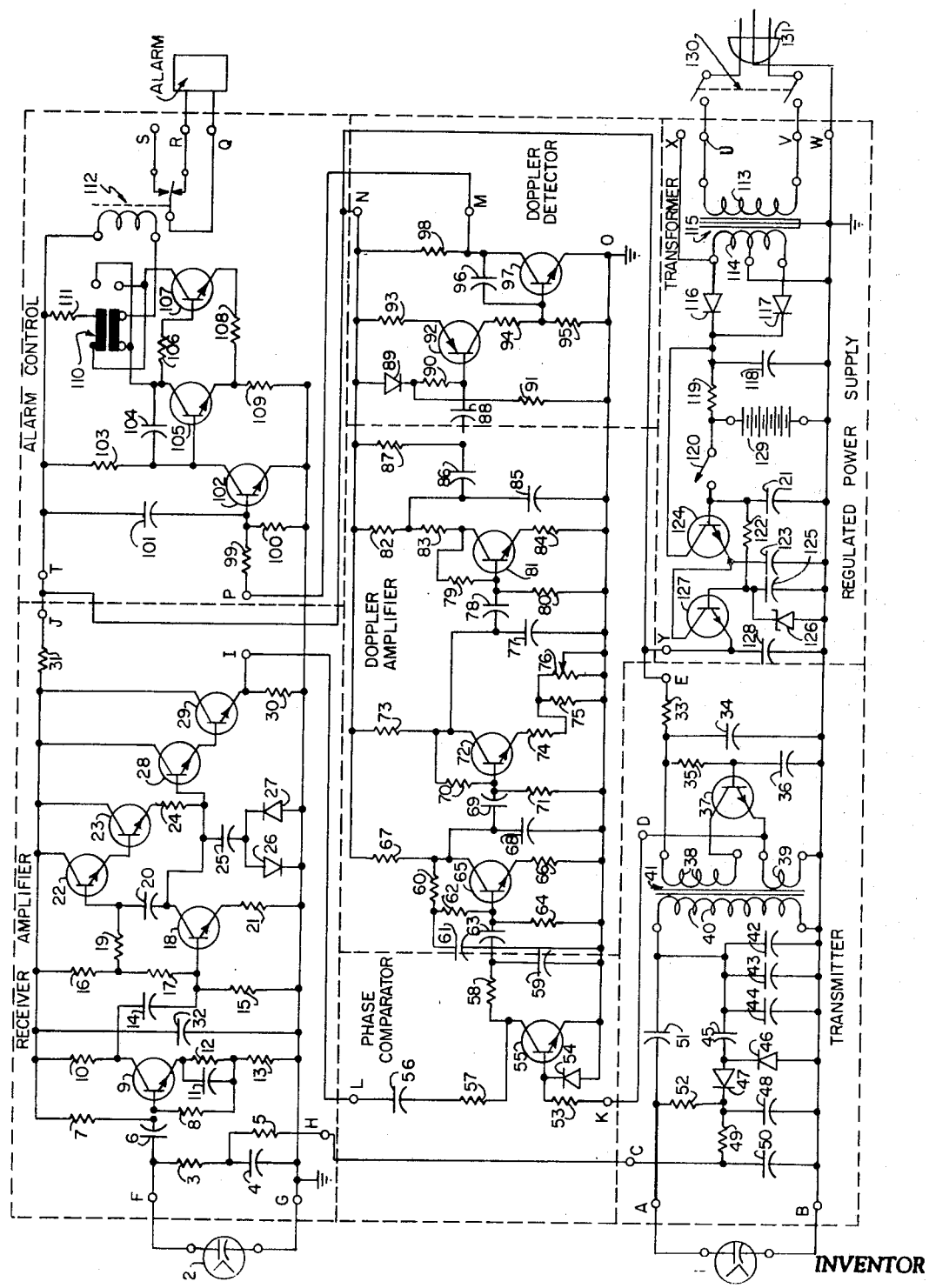
INVENTOR
C. H. PETERSON
CURTISS C. KRUEGER
BY *James C. Wray*
ATTORNEY

ULTRASONIC DETECTION SYSTEM

Background of the Invention

Ultrasonic intruder detection devices are well known. In general the devices operate by broadcasting a particular frequency of ultrasonic radiation which is reflected from stationary surfaces throughout a room. Part of the signal returns to the detection system and is picked up by a receiver transducer. As long as there is no moving reflecting surface within the room, the signal returned to the receiver transducer will have the same frequency as the broadcast signal. When there is a moving surface within the room, the returning radiation will carry a Doppler signal. By comparing the broadcasted and received signals, the Doppler signal is extracted to control an alarm circuit. Many problems have continuously been experienced in the use of ultrasonic detection equipment.

In previously designed ultrasonic intruder detection systems, narrow band transducers, such as ceramic elements, magnetostrictive elements and other forms of resonant transducers have been used. Operating frequencies of the equipment is limited and restricted by the particular transducers, and the circuitry must be carefully matched to the particular transducers which are employed. For these reasons, mass production has been difficult, and consequently, costs have been high. Moreover, the inability to vary operating frequencies has prevented the use of separate systems in close proximity.

Systems of conventional design use purely linear amplification of received signals. The sensitivity to motion of those systems is proportional to received signal strength. A system using linear amplification is relatively insensitive to a movement far from the set and is overly sensitive to movements close to the set.

Ultrasonic detection equipment in use employs circuits referred to as peak-to-peak responding detector circuits which use diode rectification and capacitive filtering. Those systems respond only to peak values of transients and cannot accurately evaluate moving objects in the field. Those systems are as capable of being activated by single inconsequential movements within a room as they are of being actuated by intruders whose movements are continuous over a period of time. The setting off of an alarm by trivial movements within an ultrasonic field is as much responsible for the lack of wide public use of the ultrasonic detection systems as any other reason. Heretofore, simple systems have not been available which respond only to the continued or substantial motion, such as produced by an intruder.

Many problems which remain in the ultrasonic intruder detection field are overcome by the present invention.

SUMMARY OF THE INVENTION

The present apparatus is a "zero intermediate frequency" Doppler motion detection sensor. The system operates in the ultrasonic frequency region of about 40 to 50 kilohertz and provides a relay closure output to an alarm system when sustained Doppler frequency shift due to motion has occurred. The equipment is comprised of seven major circuit sections, which are: transmitter, receiver amplifier, phase comparator, Doppler amplifier, Doppler detector, alarm control circuit, and regulated power supply.

High and low voltage 45 kilohertz signals are generated in the transmitter section to drive the transmitting transducer and the phase detector. Rectification of the high voltage 45 kilohertz AC signal provides high voltage DC to bias the diaphrams of both transmitting and receiving ultrasonic transducers.

Ultrasonic transducers are of an electrostatic type, which require high voltage DC bias in order to produce the proper tension on metallized foil diaphrams. The electro static transducers function either as transmitting or receiving elements; their fundamental functions are the conversion of electrical energy into acoustical energy and vice versa.

The transmitting transducer generates an ultrasonic sound field having a frequency determined by the transmitting section oscillator. The ultrasonic field which fills the volume of a room bounces off objects in the area and scatters in all directions. A portion of the scattered reflections heads towards the receiving element in the system. As long as no objects in the field have moved, the signal picked up by the receiver will be identical in frequency to the transmitted signal. If an object has moved in the field, the frequency of the returned signal will differ from that of the transmitted signal as a function of the velocity of motion of the moving object. This phenomena known as the Doppler effect, is well known throughout industry and science and is widely used in ultrasonic intruder detection systems.

Ultrasonic signals that return, with or without a Doppler frequency shift, are picked up by the receiving transducer and are converted thereby into an electronic signal. The electronic signal is amplified by circuitry located in the receiver amplifier section. The output signal level is an inverse logarithmic function of the input signal level; therefore, a wide range of returned signal strengths is compressed to provide a more uniform signal level. The signal that has been appropriately amplified and modified is sent to a phase comparator.

To extract Doppler frequency shift from the return signal, a phase comparator is used. The received signal is compared to the constant frequency transmitter signal, and any frequency difference appears at the output of the phase comparator. Output signal amplitude of the phase comparator is a linear function of the input signal amplitude as received from the receiver amplifier section. Output signal frequency is proportional to the velocity of moving objects in the field; typical Doppler frequency shifts are in the range of 5 to 200 hertz. The extracted Doppler signal is sent to the Doppler amplifier section.

The Doppler amplifier section of circuitry provides band pass shaping for the Doppler signal and further amplifies the weak signal that exists at that point. The response of the bandpass filter networks located in the Doppler amplifier section determines the range of acceptable Doppler frequency shifts and rejects Doppler frequency shifts lower and higher than those within an acceptable frequency range. It is not necessary for the system to respond to motion velocities which are greater than humanly possible; that consideration establishes the upper frequency shift limit of the band pass response. The lower frequency limit essentially is determined by rejecting low frequency Doppler shift phenomena caused by air turbulance and by slow movements of air due to thermal gradients that may exist in the area. The output signal level of the Doppler amplifier section therefore, is a function of the phase comparator output signal level as modified by the band-pass filter network located in the Doppler amplifier. The processed Doppler signal is fed to the Doppler detector.

The Doppler signal detector converts the AC Doppler signal to a DC signal that is proportional to the average of incoming AC Doppler signals. The output of the detector, therefore, is a well filtered DC signal which is proportional to the amount of Doppler motion sensed in the ultrasonic field. If there is no motion in the ultrasonic field, the output of the detector is zero. The output of the detector is greatest when a Doppler motion has occurred in the most acceptable range of frequency shift as determined by the band-pass filter network of the Doppler amplified section.

The alarm control circuit section provides three basic functions: threshold detection, response timing and relay output. When a DC voltage level reaches or exceeds the threshold level of the alarm control circuitry, the following events occur. An integrator begins charging and continues to charge as long as the DC threshold is exceeded. The moment that the detected DC level goes below the threshold level, the integrating capacitor immediately is discharged and is made ready to resume its timing function the next time the DC threshold level is exceeded. When the DC threshold value has been exceeded for the predetermined period of time, as controlled by a reaction timing circuit, a relay is actuated to the alarm state. The relay remains in the alarm state as long as the Doppler threshold remains exceeded. When no further motion is sensed, the relay reverts automatically to its no alarm state.

Normally open or normally closed relay contact outputs are used in the system to be connected to accessory alarm equipment. Whenever there is an alarm condition, either set of contacts changes from one state to the other state, for example, the normally closed set of contacts opens, and the normally open relay contacts close.

An important section of circuitry is the power regulator section, which accepts either 120 volt 60 cycle AC power or 18 volt DC power. The regulator section smooths out any voltage variations in the external power source to provide stable operating voltage to the circuitry. As an optional feature, the regulated power supply includes a trickle charger and a rechargeable battery. When external power is applied to the regulator circuitry, there is no drain from the internal standby battery. During that mode of operation, the battery is constantly trickle charged by power from the external source.

The moment the external power source fails for any reason, the solid-state circuitry automatically switches in the standby battery power, thus, preventing fluctuation in the output voltage. The electronic circuitry therefore is continually supplied with well regulated operating voltage. The performance of the regulator section thus determines to a great extent the overall operating stability of the equipment.

In previously designed ultrasonic intruder detection systems, narrow band transducers such as ceramic elements, magnetostrictive elements, and other forms of resonant transducers have been used, thus restricting the operating frequency of the equipment. In the present equipment, broad band electrostatic transducers are used to allow much broader choices of operating frequencies, thus allowing many units to be used in the same area without interfering with each other. With the ability to preassign frequencies, hence channels, the basic problem of matching the electronic circuitry to the resonant characteristics of the transducers is eliminated, and production runs can be more easily planned.

Systems of conventional design utilize purely linear amplification of received signals. The system presented herein departs radically from this general design approach. In the receiver amplifier section, unique circuits are used in order to present inverse logarithmic gain characteristics. The characteristics are approximately as follows, for a 1000 to 1 change in input signal level there is a 3 to 1 change in output signal level. A virtually constant output signal level is produced, even though there is a tremendous variation in input signal level. The inverse logarithmic gain characteristic yields a system that is truely phase sensitive rather than amplitude sensitive to receive ultrasonic signals. The logarithmic characteristic provides a system that is of uniform sensitivity as a function of range. If it were not for the nonlinear characteristic, the system's sensitivity to motion would then be proportional to the received signal strength. That very undesirable system characteristic represents the common practice used in the electronic intruder detection field.

The phase comparison technique used in the present system functions similarly to techniques employed in other systems. The use of a transistor rather than an array of diodes as the phase comparison element, which is unique to the present system, provides a very simple arrangement to accomplish the comparing and extracting function.

The coupling elements and load resistors in the Doppler amplifier section are selected to form a multistage band-pass filter network. The circuit values of the amplifier stages are designed to function in that way, to eliminate the complexity of providing one set of circuit components for amplification purposes and a second set of circuit components to provide band-pass filtering.

Detector circuits in conventional electronic intruder detection equipment can be classified as peak or peak-to-peak responding detector circuits using diode rectification and capacitive filtering. A simple and true average responding detector has been created with a well filtered DC output. The true averaging detector circuit has the distinct advantage of responding to only the average of short interval transients rather than the peak value of these transients. A true average responding detector circuit of the present invention utilizes a transistor in conjunction with a Miller integrator to perform that difficult but desirable function. The averaging detector circuit of the present invention more properly evaluates the presence of moving objects in ultrasonic fields.

Threshold detection is performed by a transistor circuit. The transistor stage is much like a switch which is on when the threshold has not been exceeded and which is off when the threshold has been exceeded. By utilizing a resistor capacitor network in the output of that stage, an integration process is performed whereby the buildup time constant is determined by the RC product but wherein the decay time constant is instantaneous due to the switching action of the threshold transistor. This dual time constant integration process does not allow buildup of charge across the integrating capacitor; therefore, trivial motions in the ultrasonic field do not trigger the alarm control circuit. The present type of timing technique which is not utilized in known equipments of similar design provides a substantial improvement in performance particularly with respect to avoiding undesirable causes which would normally set off the alarm system. A switching circuit used in conjunction with the alarm relay allows the user to select either a power fail-safe or power safe mode of operation of the alarm relay. The particular option a user selects is dependent upon his particular use of the equipment, and therefore, yields a degree of versatility to this equipment's design.

The electrostatic transducers require high voltage DC bias and the transmitting transducer requires a high voltage AC signal to drive its diaphragm at a rate established by the oscillator circuit. A novel approach is used to perform both of those basic functions. The supply voltage available in typical solid-state equipment is usually in the 12 volt range, but 270 volts DC and 250 volts peak-to-peak AC are required for the electrostatic transducers. A solid-state oscillator circuit operating off a supply voltage of 12 volts and supplying these required output voltages is implemented. The frequency of oscillation is found to be very stable, as well as the amplitude of oscillation. Both of these parameters are considered to be operating parameters of the system; the requirements for stability are very stringent. A means of rectifying the high voltage AC signal is included to provide the DC bias requirements for the transducers. It is found that the DC bias is also very stable due to the fact that the AC signal is a very stable signal.

Conventional means are used in rectifying the AC power into a DC voltage. The DC feeds the regulator circuitry as well as the optional standby trickle charging circuit for a rechargeable battery supply. A unique circuit arrangement is used to provide standby power that is regulated, as well as conventional power that is regulated. A continuous well-regulated output voltage is provided even during the critical switchover between conventional power and internal battery standby power. All of those functions are accomplished by the particular regulator circuit arrangement used, and no additional complex circuits are required over and above those required for the basic regulating function. The output voltage can be switched on and off by a switch located in the low-current portion of the circuit. A simple switching arrangement arms and disarms the total ultrasonic electronic system. A switch located in the primary circuit of the AC transformer is used simply to turn on and off the DC power to the trickle charging circuit and the regulator. The latter switch does not disable the system if the first switch is turned on. The primary purpose of the switch in the AC primary circuit is to provide personnel safety in the event the system must be serviced.

As used herein, intruder may mean an unwanted motion producer or motion produced thereby within a field of radiation. Ultrasonic intruder detectors cover all radiant energy sensing devices which operate by detecting Doppler effects in received radiant energy.

This invention has as an objective the provision of an electronic intruder detection system which radiates wave energy, which receives wave energy which carries a Doppler component when motion occurs having an improved inverse logarithmic receiver amplifier, Doppler signal extractor, combined Doppler signal amplifier and band-pass filter which removes low and high Doppler signals while amplifying the signal, an average responding detector which produces a well filtered DC output, and an integrator which controls an alarm in response to continued reception of Doppler signals over a predetermined time.

Another objective of this invention is the provision of averaging and integrating circuits for electronic intruder detection systems.

This invention has as a further objective the provision of electronic intruder detection systems employing broadband electrostatic transducers.

Another objective of this invention is the provision of an inverse logarithmic amplifier for electronic intruder detection systems.

A further objective of the invention is the provision of a simple transistorized phase comparison circuit for an electronic intruder detection system.

The invention has as another objective the provision of combined multistage amplifier and band-pass filter for simultaneously amplifying the Doppler signal and limiting the output to Doppler ranges with intruder capabilities.

A further objective of this invention is the provision of average responding detection which is insensitive and nonresponsive to short interval transients in a Doppler signal.

The invention has as a further objective the provision of a threshold responsive integrating circuit for responding to only those Doppler signals which are sufficiently long to meet predetermined time requirements.

These and other objectives of this invention will be apparent from the disclosure which includes the specification, claims and drawing.

BRIEF DESCRIPTION OF THE DRAWING

The drawing is a schematic representation of operative parts and interconnections of a preferred form of circuitry for accomplishing the objectives of this invention. The overall circuitry has been shown as subdivided into seven sections for convenience in understanding the relationship and function of circuit components.

DETAILED DESCRIPTION OF THE DRAWING

Reference is made to the accompanying schematic drawing.

Receiver Amplifier Section: Terminal F is the input to the amplifier section where receiver transducer 2 is connected. The ground return for receiver transducer 2 is connected to terminal G. High voltage DC bias for receiving transducer 2 is connected to terminal H. Resistor 5 and capacitor 4 filter any residual 45 kilohertz AC signal from the DC bias voltage. Resistor 3 shunt feeds the high voltage DC bias to transducer 2. Capacitor 6 serves to block the high voltage DC from transistor 9, and also serves to couple the AC signal from transducer 2 to the base of transistor 9. Transistor 9 in conjunction with resistors 7, 8, 10, 12, 13 and capacitor 11, serves as a common emitter amplifier. Capacitor 11 is effectively a short at 45 kilohertz and at frequencies below this it serves to degenerate the stage gain and, therefore, causes the response of the stage to roll off at lower frequencies. Capacitors 6 and 14 function in an identical manner as well.

Resistors 16, 17, and 15 divide the supply voltage into two equal parts for the following stage. Transistor 18 serves as a common emitter amplifier. The gain is determined by the effective load impedance as seen by the collector of transistor 18 divided by the resistance in its emitter circuit as determined by resistor 21. Resistor 19 and 24, capacitor 20 and transistors 22 and 23 form a high impedance bootstrapping circuit, functioning as the collector load impedance for transistor 18. Since capacitor 20 couples the AC signal to the base of transistor 22, and due to the compound connection of transistors 22 and 23, there will be an identical AC voltage at the top of resistor 24 as well as at the bottom of resistor 24. Therefore, resistor 24 will appear as if its impedance is infinite. In the practical sense, the impedance is indeed finite. In summation, transistor 18 in conjunction with resistor 21, and transistor 23 in conjunction with resistor 24, act as current sources with a negative and positive supply respectively. Capacitor 25 couples the AC signal to diodes 26 and 27. The impedance of these diodes is a function of the voltage across each of their junctions. The current is a logarithmic function of the voltage impressed across them; therefore, the impedance of the network 25, 26 and 27 will be an inverse logarithmic function according to the level of the incident signal. Transistors 28, 29 and resistor 30 serve to furnish the required current gain in order to feed the high impedance signal to a low impedance circuit and isolate any following circuit impedance changes from the high impedance point in this circuit. Resistor 31 and capacitor 32 serve as decoupling elements in the power supply to this section of circuitry.

Phase Comparator Section: The signal from the receiver amplifier section of circuitry is coupled to the phase comparator through terminals I and L, capacitor 56, and resistor 57. The reference signal developed by the transmitter section is fed to the phase comparator through terminals K and D and resistor 53 to the base of transistor 55. The base emitter junction of transistor 55 in conjunction with diode 54 cause a square wave current to flow, even though the signal at point K is of sinusoidal form. The square wave current causes transistor 55 to turn on and off abruptly at the same rate as the oscillating frequency of the transmitter section. The collector to emitter junction of transistor 55, therefore, acts as a switch. During one-half of a cycle it is open and during the other half of the cycle it is closed. During the open half of the cycle, the signal from the receiver section is allowed to pass without attenuation; during the other half of the cycle, the signal is effectively shorted to ground. Resistor 58 and capacitor 59 effectively filter the 45 kilohertz switching rate. Thus, the output consists of any phase difference or frequency difference between the two incident signals, the receiver signal and the transmitter signal. At that point, the Doppler frequency shift signal is available for appropriate processing.

Doppler Amplifier Section: A stable three-stage common emitter configuration amplifier properly conditions the Doppler signal for threshold detection. Frequency response characteristics set in this section determined minimum and maximum velocities of motion that will be sensed. Gain of the receiver amplifier and the Doppler amplifier sections determines the available detection range for the coverage area. Gain of the system can be adjusted by potentiometer 76, which is adjusted to determine the minimum signal level required for detection. Since the slope of the high and low frequency roll-off characteristics of the band-pass filter networks located in this section of circuitry are not infinite, the potentiometer control also affects the minimum and maximum velocities of motions that are detected.

Resistor 60 and 62 and capacitor 61 comprise a resistor capacitor timing network that biases transistor 65. On initial application of power to the circuit, capacitor 61 will be at zero charge, and, therefore, transistor 65 will be cut off. Thus, any Doppler signals present at the input of the Doppler amplifier section, upon initial power application, will not pass through the Doppler amplifier stage and, therefore, will not trip the detection circuitry that follows. The timing function provided by the charging of capacitor 61 allows the vacating of the protected area that the equipment is located in after switching on the ultrasonic detector. After a specified period of time, capacitor 61 becomes charged and allows transistor 65 to begin to conduct and to amplify the signal that is incident upon its input.

Series capacitors 63, 69, 78, and 86 serve to determine the low frequency roll-off point in the gain characteristics of the multistage Doppler amplifier section. Capacitors 68, 77, and 85 determine the high frequency roll-off characteristics of the section. Therefore, the four section high pass filter and the three section low-pass filter are uniquely combined to form the aforementioned band-pass filter network.

The ratio of resistor 67 to resistor 66 determines the gain of the first stage. The ratio of resistor 73 to the combined resistance value of resistors 74, 75 and potentiometer 76 determine the gain of the second stage. The gain of the second stage, therefore, is inversely proportional to the resistance of potentiometer 76. The maximum value of gain is determined by resistor 74. The minimum gain value is determined by the maximum resistance of resistors 74 and 75 and potentiometer 76. Resistors 82 and 83, in conjunction with resistor 84, determine the gain of the third stage.

Resistors 60, 62, 64, 70, 71, 79, and 80 form the bias networks for each of the three stages. Resistor 87 insures the proper polarity will always exist across capacitor 86.

Doppler Detector: The processed Doppler signal is fed to the base of transistor 92 through capacitor 88. Resistor 90 and capacitor 88 form the final section of high pass filtering for the Doppler signal. Transistor 92 operate as a class B amplifier. Diode 89 is forward biased by resistor 91 and establishes the proper base to emitter voltage for class B operation. The ratio of resistor 94 to resistor 93 determines the gain of the detector stage. The detector conducts on negative half cycles of the incoming Doppler signal. The output is a purely resistive load, thus forming the foundation for a true average responding detector response. Resistors 95 and 98, capacitor 96 and transistor 97 form the Miller integrator circuit which smooths out the AC component of the rectified signal and responds only to the average of the rectified signal. The output at point M, therefore, is a DC signal that is proportional to the true average of the incoming AC Doppler signal.

The finite AC signal amplitude available across resistor 87 in conjunction with the high pass filter characteristics of capacitor 88 and resistor 90 determine the lowest possible frequency that the detector will give a suitable output voltage for threshold. This interrelationship is utilized to determine the absolute low frequency cutoff point, irregardless of received signal strength or sensitivity setting of the system. In this way undesirable low frequency phenomena is completely rejected.

Alarm Control Circuit Section: The ratio of resistor 99 to resistor 100 establishes the threshold DC level required to cause transistor 102 to turn off. Capacitor 101 functions to remove any residual AC component on the DC signal not removed by the Miller integrator in the Doppler detector section. Transistor 102 is, therefore, on when there is no Doppler signal sensed and off when there is a Doppler signal that exceeds the threshold value.

Transistor 105, capacitor 104 and resistor 103 comprise the Miller integrating reaction time circuitry. Capacitor 104 charges immediately through the low resistance of transistor 102. It slowly discharges through resistor 103 when transistor 102 is off. It is these two different RC time constants that establish this high ratio of attack to decay time.

When the collector voltage of transistor 105 has dropped to a low value after the previously mentioned time constant, transistor 107 is caused to shut off, and resistor 108 and 109 form a regenerative feedback path to transistor 105 to cause it to turn on. Hence, transistors 105 and 107 are alternately on and off and change state as determined by the voltage at the base of transistor 105.

Resistor 111 and relay 112 are the collector loads of these two transistors. Switch 110 determines which load is connected to which collector. When the relay is connected to the collector of the on transistor, the relay is energized in the no alarm state. When an alarm state occurs, the relay deenergizes. When switch 110 is set in the other position, the opposite chain of events would occur. These two arrangements are referred to as the power fail-safe and power safe modes respectively. As shown in the drawing, for example, relay 112 is connected in the collector circuit of transistor 105.

Terminals Q, R and S are the relay contact terminals which are connected to conventional accessory alarm equipment that is triggered by this motion sensor system.

Transmitter Section: A transformer coupled oscillator arrangement is used to develop the 45 kilohertz ultrasonic oscillation frequency. The secondary 40 of transformer 41 is tuned to proper frequency by capacitors 42, 43, and 44. The use of a ferrite core transformer 41, which results in a high Q inductor, along with the use of high Q capacitors, yields a resonant circuit that exhibits very stable frequency characteristics. Transistor 37 in conjunction with resistor 35 and capacitor 36 functions as a class C common base amplifier. Primary 38 couples the collector circuit to the resonant secondary circuit. Primary 39 is also coupled to the magnetic circuit and forms the regenerative feedback path to the emitter circuit of transistor 37. Transistor 37 conducts completely on and shuts completely off, therefore, producing a constant amplitude signal across primary 38 and hence a constant amplitude oscillator output. Resistor 33 and capacitor 34 form a decoupling network from the power supply voltage.

The output voltage at point D is low level and low impedance appropriate to drive the phase comparator circuit. The high voltage AC output from the secondary 40 is coupled through capacitor 51 to transmitting transducer 1 at point A.

Capacitors 45, 48 and 50, diodes 46 and 47, and resistor 49 provide a peak-to-peak responding rectification circuit to produce the required high voltage DC bias for both transducers 1 and 2. High voltage DC bias for transducer 1 is fed by resistor 52. High voltage DC bias for transducer 2 is available at point C. This bias voltage is well filtered by resistor 49 and capacitor 50 to remove as much of the 45 kilohertz AC signal as possible at this point. Point B is the ground return for the transmitting transducer 1 and the transmitter circuit section.

Regulated Power Supply Section: 120 volt AC 60 cycle power from plug 131 through switch 130 is available at points U and V. Transformer 115 converts this high voltage AC, that is present on the primary 113, to a low voltage AC at secondary 114. Diodes 116 and 117 rectify the AC power in conjunction with capacitor 118, which filters the rectified power to provide low voltage DC power to the input of the DC regulator and the trickle charging circuit. Resistor 119 determines the charging rate for battery 129. Normally, the only current drain on battery 129 is through resistor 122 to Zener diode 126. The current that is required to operate all of the electronic circuitry flows through transistors 124 and 127 and not through battery 129. If the AC power were to fail then all the current would be supplied by battery 129. The current path for this mode of operation would be from battery 129 through the base emitter junction of transistor 124 then through transistor 127. At this point the operation of the regulator circuit functions as normal and a well regulated output voltage is maintained.

If transformer 115 is removed, then point X can serve as the external power input for 18 volt DC power. In this mode of operation, diode 116 serves as a reverse polarity protection device. From this point on the circuit operation is as before.

Since the voltage drop across Zener diode 126 remains constant and the base emitter voltage drop of transistor 127 remains essentially constant, the output voltage of the regulator is constant. Capacitors 121, 123 and 125 serve to filter any AC components on any of the three possible power sources. Capacitor 128 serves as the final AC filter for the regulator. Point Y is the regulator output and is connected to all active circuits in this system.

When switch 120 is opened the voltage at point Y will go to zero, thus disabling the complete system. If AC or DC power is still applied at the input to the regulator, battery 129 will still be in the charging mode even though the regulator output is at zero. With switch 120 closed, the system is activated and the regulator will function on any of the three possible power sources.

Terminal W serves as the central grounding point of the total electronic system and serves to adequately ground the equipment. The AC power ground connection is made at this point or 18 volt DC power input negative is connected at point W.

Selection of the power safe or power fail-safe mode of operation is made by the user of the equipment. In either case, the timing function that allows vacating the protected area is the same. For the first 30 seconds after initial turn-on, the gain of the Doppler amplifier is zero; therefore, movement in the protected area will not trip the alarm control relay. For the next 30 seconds the gain of the system will gradually increase to the full sensitivity value, as determined by the setting of the sensitivity control 76. This characteristic allows the environment in the protected area to partially stabilize or settle down before the equipment is at full sensitivity.

When motion or intrusion into the protected area occurs after the initial 60 second period, the alarm control relay will be tripped and will remain in the alarm state as long as motion exists. The equipment automatically recycles to the no-alarm state when motion stops or the intruder leaves the protected area. A need for manually resetting the unit therefore is eliminated because of this nonlatching feature.

Most alarm indicating devices are of the latching type and will continue to indicate an alarm even though the detected motion has ceased. The ultrasonic intruder detector herein described reverts back to the no-alarm (no motion) condition when motion in the protected area ceases. This arrangement establishes the control of a complete alarm system at the most logical point. The ultrasonic intruder detector incorporates these particular features in order to be as versatile and as compatible as possible with present available alarm indicating devices.

While the invention has been particularly shown and described with reference to a preferred embodiment thereof, it will be understood by those skilled in the art that various changes in form and details may be made therein without departing from the spirit and scope of the invention.

That which we claim is:

1. In electronic intruder detection apparatus in which transmitters broadcast waves into a space, in which objects within the space reflect waves to receivers and in which comparison means connected to the transmitters and receivers compares broadcast and received waves and extracts Doppler effects which indicate the motion of objects within the space, the improved combination comprising: a power source including AC generating means, a transmitter transducer connected to the AC generating means, for driving the transmitter transducer to direct waves into a space, a receiver transducer directed toward the space for receiving waves therefrom and for converting waves impinging thereon to varying voltage signals, a receiver amplifier connected to the receiver transducer, phase comparator means connected to the receiver amplifier and to the power source for extracting Doppler signals, Doppler amplifier means and filter means connected to the comparator for strengthening the Doppler signals and removing signals above and below predetermined frequency levels, Doppler detector means connected to the Doppler amplifier for converting AC Doppler signals to DC Doppler signals, an alarm control means including integrator means connected to the Doppler detector means for operating an alarm when a DC signal from the detector means has exceeded a threshold for a predetermined time, and discharging means connected to the detector means and to the integrator means for discharging the integrator means upon interruption of the DC signal above a threshold, and an alarm means connected to the alarm control means.

2. The apparatus of claim 1 wherein the Doppler detector means comprises rectifier means connected to the Doppler amplifier for conducting on half cycles of amplified AC signals from the amplifier, and integrator means connected to the rectifier means for smoothing AC components of a half wave signal from the transistor to a DC signal having a level which is an average of the incoming signal.

3. The apparatus of claim 1 wherein the discharging means comprises threshold switching means connected to the Doppler detector means for changing state in response to incoming DC Doppler signal exceeding a predetermined level, and wherein the integrator means is connected to the threshold switching means for discharging when the threshold switching means is in a first state and for charging when the threshold switching means is in a second state, and wherein the alarm control means further comprises second switching means connected to the integrator means and to the alarm means for operating the alarm means in response to the integrator means being charged for a predetermined time.

4. The apparatus of claim 1 wherein the power source additionally comprises a high voltage DC generating means connected to the high voltage AC generating means, and wherein the transmitter and receiver transducers comprises turnable transducers connected to the high voltage DC generating means for biasing the transducer means.

5. The apparatus of claim 1 wherein the receiver amplifier comprises logarithmic amplifier means for inversely logarithmically amplifying the varying voltage signals.

6. The apparatus of claim 5 wherein the Doppler detector means comprises rectifier means connected to the Doppler amplifier for conducting on half cycles of amplified AC signals from the amplifier, and integrating means connected to the rectifier means for smoothing AC components of a half wave signal from the transistor to a DC signal having a level which is an average of the incoming signal; wherein the discharging means comprises threshold switching means connected to the Doppler detector means for changing state in response to incoming DC Doppler signal exceeding a predetermined level, and wherein the integrator means is connected to the threshold switching means for discharging when the threshold switching means is in a first state and for charging when the threshold switching means is in a second state, and wherein the alarm control means further comprises second switching means connected to the integrator means and to the alarm means for operating the alarm means in response to the integrator means being charged for a predetermined time, and regenerative feedback means connected to the second switching means for baising the second switching to a no alarm state.

7. The apparatus of claim 1 wherein the power supply further comprises sequentially connected AC input means, stepdown transformer mean, rectifying means, trickle charging means, battery means and oscillator means, the oscillator means being connected to the AC generating means.

8. The method of controlling an alarm by detecting Doppler effects in broadcast and received wave energy comprising:
charging an integrator when Doppler effects exceed a threshold level,
discharging an integrator immediately upon interruption of Doppler effects above a threshold level,
and operating an alarm when the integrator is charged to a predetermined level.

9. The method of claim 8 further comprising the preliminary steps of converting Doppler effects to Doppler signals and smoothing the Doppler signals.

10. The method of claim 8 further comprising the preliminary step of inversely logarithmically amplifying the Doppler effects.

11. In Doppler effect alarm controlling apparatus having wave transmitter and receiver means and a Doppler detector connected thereto for producing a Doppler signal, the improvement comprising:
an electronic switch connected to the detector for changing from a first state to a second state when the signal exceeds a threshold level,
an integrator connected to the switch and to the detector for discharging when the switch is in a first state and charging when the switch is in a second state and an alarm control connected to the integrator for starting an alarm when the integrator is charged to a predetermined level.

12. The apparatus of claim 11 wherein the detector further comprises integrating means for averaging and smoothing the Doppler signal.

13. In an electronic intruder detection method in which wave energy is transmitted into a space, is reflected from surfaces in the space and is received, and in which received waves are analyzed for detection of the presence of Doppler effects, which indicate occurrence of motion within the space, the improved method comprising the steps of:
- receiving reflected wave energy, converting the received wave energy to electronic signals, and logarithmically amplifying the signals, thereby producing substantially uniform strength Doppler effect signals with respect to received wave energy,
- sensing continued Doppler effects for a predetermined period, and operating a control device when Doppler effects are continued for a predetermined period, and discontinuing the sensing and operating steps upon interrupting of Doppler effects.

14. In an electronic intruder detection method in which wave energy is transmitted into a space, is reflected from surfaces in the space and is received, and in which received waves are analyzed for detection of the presence of Doppler effects, which indicate occurrence of motion within the space, the improved method comprising the steps of:
- logarithmically amplifying received wave energy signals prior to extracting Doppler signals therefrom, amplifying the Doppler signals while filtering and removing Doppler signals above and below predetermined frequencies,
- sensing continued Doppler effects for a predetermined period, and operating a control device when Doppler effects are continued for a predetermined period, and discontinuing the sensing and operating steps upon interrupting of Doppler effects.

15. In an electronic intruder detection method in which wave energy is transmitted into a space, is reflected from surfaces in the space and is received, and in which received waves are analyzed for detection of the presence of Doppler effects, which indicate occurrence of motion within the space, the improved method comprising the steps of:
- sensing continued Doppler effects for a predetermined period, converting the Doppler effects to DC signals,
- turning a switching device off in response to DC signal above a predetermined level,
- turning the switching device on in response to interrupting of the DC signal below the predetermined level,
- changing the condition of a second switching device in response to the first switching device being in off condition for a predetermined period,
- and completing an alarm circuit in response to the changing of condition of the second switching device.

16. In an electronic intruder detection method in which wave energy is transmitted into a space, is reflected from surfaces in the space and is received, and in which received waves are analyzed for detection of the presence of Doppler effects, which indicate occurrence of motion within the space, the improved method comprising the steps of:
- sensing continued Doppler effects for a predetermined period,
- converting the Doppler effects to DC signals,
- turning a switching device off in response to DC signal above a predetermined level,
- turning the switching device on in response to interrupting of the DC signal below the predetermined level,
- changing the condition of a second switching device in response to the first switching device being in off condition for a predetermined period and changing the state of a third switching device in response to the changing of condition of the second switching device, and completing an alarm circuit in response to the changing of condition of the third switching device.

17. In an electronic intruder detection method in which wave energy is transmitted into a space, is reflected from surfaces in the space and is received, and in which received waves are analyzed for detection of the presence of Doppler effects, which indicate occurrence of motion within the space, the improved method comprising the steps of:
- biasing transmitter and receiver transducers with high voltage direct current,
- sensing continued Doppler effects for a predetermined period, and operating a control device when Doppler effects are continued for a predetermined period, and discontinuing the sensing and operating steps upon interrupting of Doppler effects.